United States Patent

[11] 3,555,188

[72] Inventor Larned A. Meacham
Middletown, N.J.
[21] Appl. No. 659,440
[22] Filed Aug. 9, 1967
[45] Patented Jan. 12, 1971
[73] Assignee Bell Telephone Laboratories, Incorporated
Murray Hill, Berkley Heights, N.J.
a corporation of New York

[54] SPEECH NETWORK FOR A TELEPHONE SET EMPLOYING AN ELECTROMAGNETIC TRANSDUCER
7 Claims, 8 Drawing Figs.

[52] U.S. Cl. .......... 179/1, 330/26
[51] Int. Cl. .......... H03f 1/34
[50] Field of Search .......... 179/1A, 1F; 330/26, 27, 28; 325/414, 415

[56] References Cited

UNITED STATES PATENTS 3,169,228 2/1965 Sinniger .......... 330/26
3,214,705 10/1965 Smith et al. .......... 330/26

OTHER REFERENCES

Angelo, ELECTRONIC CIRCUITS, 1964 page 244, FIG. 9-8a

*Primary Examiner*—Kathleen H. Claffy
*Assistant Examiner*—Douglas W. Olms
*Attorneys*—R. J. Guenther and Edwin B. Cave

ABSTRACT: In a telephone speech network employing an electromagnetic transmitter, compensation for nonlinearity and stabilization of an included transistor amplifier is provided for without utilizing either inductive or capacitive circuit elements.

INVENTOR
L. A. MEACHAM
BY E. J. Snider
ATTORNEY

SPEECH NETWORK FOR A TELEPHONE SET EMPLOYING AN ELECTROMAGNETIC TRANSDUCER

BACKGROUND OF THE INVENTION

1. Field of the Invention

This invention relates to speech networks for subscriber telephone sets and more particularly to the transmitter branches of such networks.

2. Description of the Prior Art

A number of advances have been made in the prior art in the direction of adapting the speech networks of subscriber telephone sets to permit fabrication by integrated and thin film circuit techniques. Illustrative of these advances are U.S. Pat. No. 3,170,043, issued to L. A. Hohmann, Jr., Feb. 16, 1965; U.S. Pat. application Ser. No. 540,643, filed by L. N. Holzman Apr. 6, 1966 now U.S. Pat. No. 3,462,560; and U.S. Pat. application Ser. No. 548,274 filed by R. E. Holtz May 6, 1966 now U.S. Pat. No. 3,440,367. Despite these advances, which relate in part to the employment of resistive networks in lieu of hybrid induction coils, a number of problems still require solution if all of the performance and fabrication requirements are to be met. For example, some circuits still require one or more inductive circuit elements and others require a number of capacitive elements. As a result, the advantages of reduced circuit size and cost and increased reliability offered by integrated circuitry have not been fully exploited.

Another longstanding problem in telephone speech networks relates to the utilization of carbon transmitters with their inherent carbon noise and variation in sensitivity with loop length. The utilization of other transmitter types, such as electromagnetic, in lieu of carbon transmitters has not met with success owing to the need for amplification which in turn requires circuitry providing stabilization and compensation for amplifier nonlinearity. Heretofore, such circuitry has been unduly complex and generally incompatible with integrated and thin film circuit forms.

Accordingly a general object of the invention is to improve the performance of telephone set speech networks.

Another object is to enhance the transmission characteristics of telephone speech networks while at the same time rendering such circuits more adaptable to fabrication by integrated and thin film circuit techniques.

SUMMARY OF THE INVENTION

Although one goal of current telephone speech network development work is to devise a circuit of improved characteristics that is fully compatible with integrated circuit fabrication, it is somewhat unrealistic, from a purely commercial point of view, to plan any radical and abrupt change in all telephone sets currently in use. It may be desirable, however, to consider the possibility of certain interim network modifications that would constitute a major step toward the goal indicated without the investment sacrifice that would be involved in any sudden and complete replacement of all presently installed speech networks.

The principles of the invention deal primarily with the transmitter branch of a telephone speech network. A circuit in accordance with the invention in uniquely versatile in that it may be used as a direct replacement for the transmitter branch of conventional speech networks now in use, or, alternatively it may be employed with but minor modification as the transmitter branch of a complete integrated circuit type speech network employing resistive bridges in lieu of hybrid coils in the manner shown by Hohmann, for example, in the patent cited above.

In one illustrative embodiment of the invention an electromagnetic transmitter is employed in the transmitter branch of a telephone speech network in lieu of the conventional carbon transmitter. A two-stage transistor amplifier is used to compensate for the comparatively low level output of the transmitter. In accordance with the invention the collector current of the second-stage transistor is bisected, one half flowing through a resistor and the other half through a diode. The voltage drop across the resistor provides stabilizing emitter feedback while the drop across the diode is employed to compensate for nonlinearity. No extra power is required over that conventionally provided over the subscribers loop. The entire circuit of this embodiment, which includes only resistors and semiconductor devices, may readily be fabricated as an integrated circuit and mounted on or within the electromagnetic transmitter.

DESCRIPTION OF THE EMBODIMENTS

Figure 1:
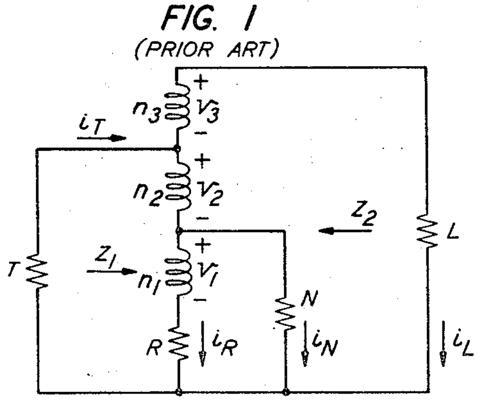
FIG. 1 (PRIOR ART)
FIG. 1 is a simplified schematic circuit diagram of a conventional telephone speech network commonly identified as the "500 Set"

The simplified schematic circuit diagram of the speech network of a conventional "500 Set" telephone of FIG. 1 is shown herein to illustrate its compatibility with a transmitter branch in accordance with the invention. The conventional transmitter branch is represented by that portion of the circuit that includes the resistor T. Other elements shown include the windings $n_1$, $n_2$ and $n_3$ of the hybrid coil, the resistor R representing the receiver branch, the resistor N representing the sidetone neutralizing arm of the speech network and the resistor L representing the line. Associated arrows indicate the relative instantaneous directions of the transmitter signal current $i_T$, the receiver current $i_R$, the neutralizing arm current $i_N$ and the line current $i_L$. Voltage drops across the hybrid coils $n_1$, $n_2$ and $n_3$ are indicated by the corresponding designations $v_1$, $v_2$ and $v_3$. Impedance designations include the load or line impedance $Z_1$ and the impedance $Z_2$ presented to the line.

In considering the parameters required for a transmitter branch in accordance with the invention when substituted for a conventional transmitter branch, reference to specific circuit element magnitudes is helpful. The following values which are made with reference to the circuit shown in FIG. 1 are illustrative.

$$n_1:n_2:n_3=427:381;\quad 1{,}160=v_1:v_2:v_3$$
$$T=100\Omega$$
$$R=128\Omega$$
$$N=68\Omega$$
$$L=900\Omega$$

Figure 2:
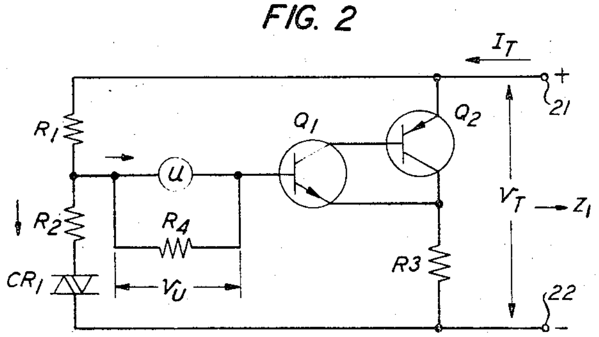
FIG. 2 is a schematic circuit diagram of one embodiment of the invention showing the transmitter branch of a telephone set speech network.

A transmitter circuit in accordance with the invention suitable for use in combination with a speech network of the type that employs a resistive network in lieu of an inductive hybrid is shown in FIG. 2. Just as in a transmitter circuit employing a carbon transmitter, this circuit modulates direct current supplied to it through its signal output terminals 21 and 22. The electromagnetic transmitter U, bridged by a matching resistor R4, applies signal potential between a biasing voltage divider, consisting of the series resistors R1 and R2, and the base terminal input of a two-stage DC coupled transistor amplifier employing the transistors Q1 and Q2. The gain of this amplifier, and hence the transmitting sensitivity, and also its output impedance are almost completely determined through feedback by the magnitude of the biasing resistors R1, R2 and R3.

Diode CR1, which is preferably of the same semiconductor material, e.g. silicon or germanium, as transistor Q1, introduces an additional bias to compensate approximately for the DC emitter-base voltage of transistor Q1, including its variations with temperature. As a result of this compensation, both diode CR1 and the emitter resistance of transistor Q1 may be ignored in rough design calculations. After the magnitudes of resistors R1, R2 and R3 have been determined to give a required sensitivity and output impedance, more exact values can be obtained by subtracting the variational impedance of diode CR1 from the value of resistor R2 and that of the emitter junction of transistor Q1 from resistor R3.

In order to adapt a circuit of the general form shown in FIG. 2 to a circuit form suitable as a replacement for the transmitter branch of a "500 it is essential first to determine a set of design parameters. The transmitter U is assumed to have a nominal impedance of 1500 ohms with a corresponding full load output voltage of 0.0708 volts (RMS) across a matching 1500 ohm load for 25 dB above normal sound pressure at the design frequency of 1000 Hz. For such a signal the corresponding station set output to the loop should be on the order of 10 mW. Conventional analysis of the circuit shown in FIG. 2 when employed as the transmitter branch, i.e. in lieu of the transmitter T, in a speech network of the general form shown in FIG. 1 and under the conditions indicated produces the following results:

| | |
|---|---|
| $i_L = 3.33$ ma. (RMS) | $v_1 = 0.646$ v. (RMS) |
| $i_N = 9.80$ ma. (RMS) | $v_2 = 0.576$ v. (RMS) |
| $i_R = 0.15$ ma. (RMS) | $v_3 = 1.758$ v. (RMS) |
| $i_T = 13.28$ ma. (RMS) | $i_T Z_1 = 1.24$ v. (RMS) |
| $Z_1 = 93.5\Omega$ | $i_L L = 3.00$ |
| $Z_2 = 875\Omega$ | $i_T/i_L = 3.99$ |

For the purpose of further analysis the most significant of the above measurements is the full load amplifier output current $i_T$, the load impedance $Z_1$, and the corresponding output voltage $i_T^{Z}{}_1$. The peak value corresponding to the RMS figure given for $i_T$ 18.9 mA and the peak voltage across the impedance $Z_1$ is 1.75 volts. These full load values are roughly compatible with a DC power supply to the transmitter of approximately 20 mA, producing a drop of 2 volts across a DC terminal resistance of around 100 ohms.

Figure 3:
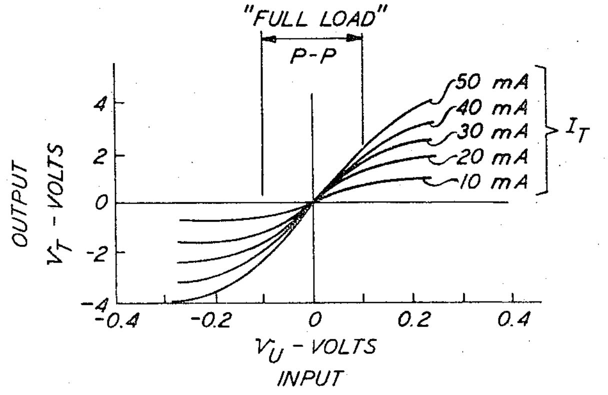
FIG. 3 is an input versus output voltage plot demonstrating the performance of the circuit shown in FIG. 2 for various levels of transmitter current.

The input-output voltage characteristics for the circuit of FIG. 2 employed in the manner indicated above are shown in FIG. 3. Instantaneous input voltages, measured across the transmitter U, are plotted horizontally. Full load, which is arbitrarily taken to be 25 dB above normal sound pressure, is represented by a peak-to-peak horizontal deflection of ±0.1 volt. Vertical deflection represents the output voltage of the amplifier across a 100-ohm load. Plots are superimposed for a family of supply currents of 10 mA through 50 mA at 10 mA interval.

Although a circuit of the type described gives fairly good speech quality and volume, ideal performance is restricted by certain limitations which are evidenced by the plots shown in FIG. 3. These limitations are nonlinearity over the operating amplitude range, except at supply currents $I_T$ approaching 50 mA, and variation in sensitivity with supply current.

In the evolution of the principles of the invention it was recognized that the nonlinearity and variable gain are produced by the current-voltage characteristics of the diode CR1 and by the emitter resistance of transistor Q1. It was further recognized that these factors do not tend to correct for one another. It was also concluded that the variation in sensitivity with DC supply is to be expected for if the circuit were redesigned to give the same sensitivity and impedance, but at different supply currents, it would require new corrections for the variational diode resistances.

An additional conclusion made with respect to the circuit of FIG. 2 is that the reason for the failure of the exponential curve of the diode CR1 to compensate for that of transistor Q1 is that for an input from the transmitter U the diode and emitter currents vary in different directions. Specifically, when transistor Q1 passes more current, transistor Q2 also draws more current through the load impedance $Z_1$; hence, the terminal voltage across the resistors R1, R2 and R3 is reduced and diode CR1 carries less current. For full compensation, however, these two currents must vary in direct proportion to each other.

Figure 4:
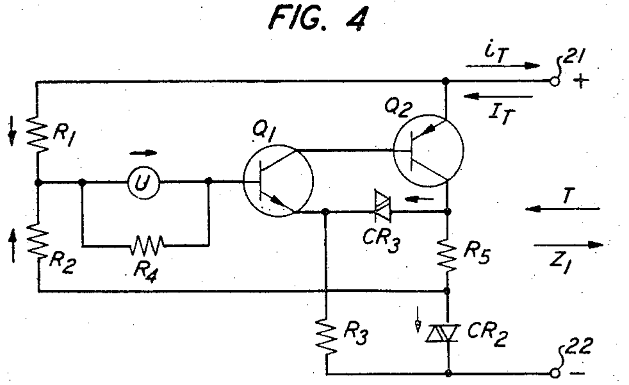
FIG. 4 is a schematic circuit diagram of a second embodiment of the invention showing the transmitter branch of a telephone set speech network.

The problems indicated are met in accordance with the principles of the invention by the circuit shown in FIG. 4. In this embodiment of the invention the relatively large collector current of transistor Q2 is bisected by passing it through two essentially equal paths in parallel. One of these paths includes the series combination of a resistor R5 and a diode CR2. The other path includes the diode CR3 and the resistor R3. In these two paths the diodes and resistors are connected in the reverse order. As in the circuit shown in FIG. 2, the potential drop across resistor R3 determines the emitter potential of transistor Q1, while the drop across the diode CR2 is applied by way of resistor R2 and the transmitter U to the base of transistor Q1. Currents associated with the two tap connections are negligible, which is to say that the emitter current of transistor Q1 is small in relation to that through the resistor R3 and the current through the resistor R2 is kept small compared to the current through the diode CR2. It has been determined that the desired proportionality between the current through the diode CR2 and the emitter of transistor Q1 depends upon the constancy of the alpha of transistor Q1 and the beta of transistor Q2 as well as upon the likeness of the two paths that share the collector current. No special component selection is required, however, inasmuch as ordinary components of good quality meet these conditions reasonably well.

At this point it should be noted that the current bisection called for by one of the features of the invention is in fact a special case of the real need which is for the currents in resistor R3 and diode CR2 to have a dependable fixed ratio. In employing resistors and diodes in series relation, however, the simplest approach to the achievement of a fixed current ratio is to make the two currents equal.

With the attainment of a satisfactory current proportionality by the means indicated, all changes in voltage across the emitter resistance of transistor Q1 are effectively canceled by corresponding changes across diode CR2 and, as a result, no variational impedance corrections need be applied to the calculated values of resistors R2 and R3. It therefore follows that a design carried out for the circuit of FIG. 2 can readily be translated to the circuit of FIG. 4 merely by omitting such corrections and giving to resistor R3 twice its calculated value to make up for carrying half the current. The resistance magnitudes of resistors R3 and R5 are of course made equal.

Although the circuit of FIG. 4 substantially solves the problems outlined above that are associated with the circuit of FIG. 2, a new problem relating to DC biasing is introduced by the circuit of FIG. 4 owing to the fact that the current through diode CR2 is substantially larger than the emitter current of transistor Q1—by a factor equal to half the beta of transistor Q2. This current difference causes the drop across diode CR2 to exceed that across the Q1 emitter-base junction by a constant but significant amount. The effect is to give the circuit too low a DC resistance, thus robbing it of supply voltage and output amplitude range. A solution for this problem is provided by the circuit shown in FIG. 5.

Figure 5:
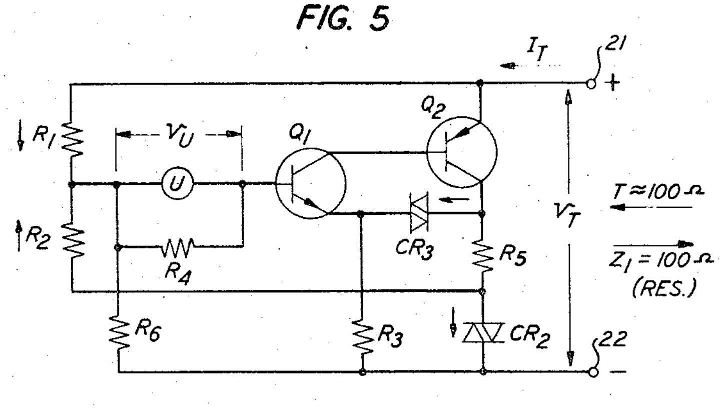
FIG. 5 is a schematic circuit diagram of a third embodiment of the invention showing the transmitter branch of a telephone set speech network.

The single modification of the circuit of FIG. 4 that is introduced by the circuit of FIG. 5 is the employment of an additional resistor R6 bridged from the junction of resistors R1 and R2 to the negative supply terminal 22. It has been found that the voltage across resistor R6 is high enough, particularly if silicon rather than germanium is employed for transistor Q1 and diodes CR2 and CR3, so that the resistance magnitude selected for resistor R6 may exceed that of resistor R2 by a sufficiently large ratio to prevent any significant attenuation of the correction voltage from diode Cr2.

Listed below are typical resistance magnitudes suitable for the circuit of FIG. 5.

| | Ohms |
|---|---|
| $R_1$ | 4, 700 |
| $R_2$ | 150 |
| $R_3$ | 5. 3 |
| $R_4$ | 1, 500 |
| $R_5$ | 5. 3 |
| $R_6$ | 1, 400 |

Figure 6:
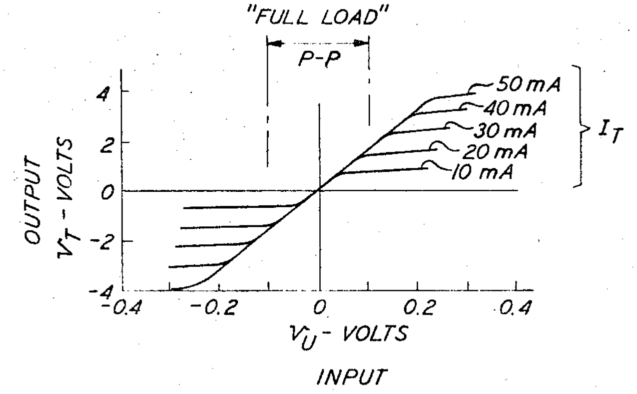
FIG. 6 is an input versus output voltage plot demonstrating the performance of the circuit shown in FIG. 5 for various levels of transmitter current.

The input-output voltage plot of the circuit of FIG. 5 shown in FIG. 6 indicates good linearity up to overload and a sensitivity that is quite independent of supply current. Moreover, it will be noted that for currents greater than about 20 mA, the linear region extends over the entire peak-to-peak range of "-full load" input amplitudes, namely ±0.1 volt.

Listening tests have been made with the circuit of FIG. 6 in comparison with a conventional carbon transmitter operating in the same "500 Set" speech network. These tests indicated noticeably greater sensitivity for the transmitter circuit in accordance with the invention on long loops of 18.000 to 30.000 feet for which the DC loop current varied from 20 to 14 mA. On these loops the amplitude range of the linearized circuit was fully satisfactory and listeners were not aware of peak clipping or other distortion of shouted speech.

With reduced loop length, the only increase in level received from the linearized circuit by the listening subscribers is that resulting from the decrease in actual loop transmission loss which is partially compensated for by a conventional equalizer. From the carbon transmitter, on the other hand, the signal level is further raised as a result of greater loop current.

Figure 7A:
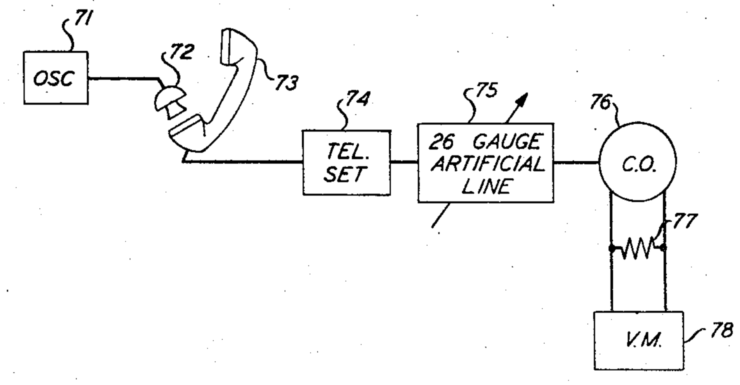
FIG. 7A is a block diagram of a sensitivity test arrangement employed in testing an embodiment of the invention.
Figure 7B:
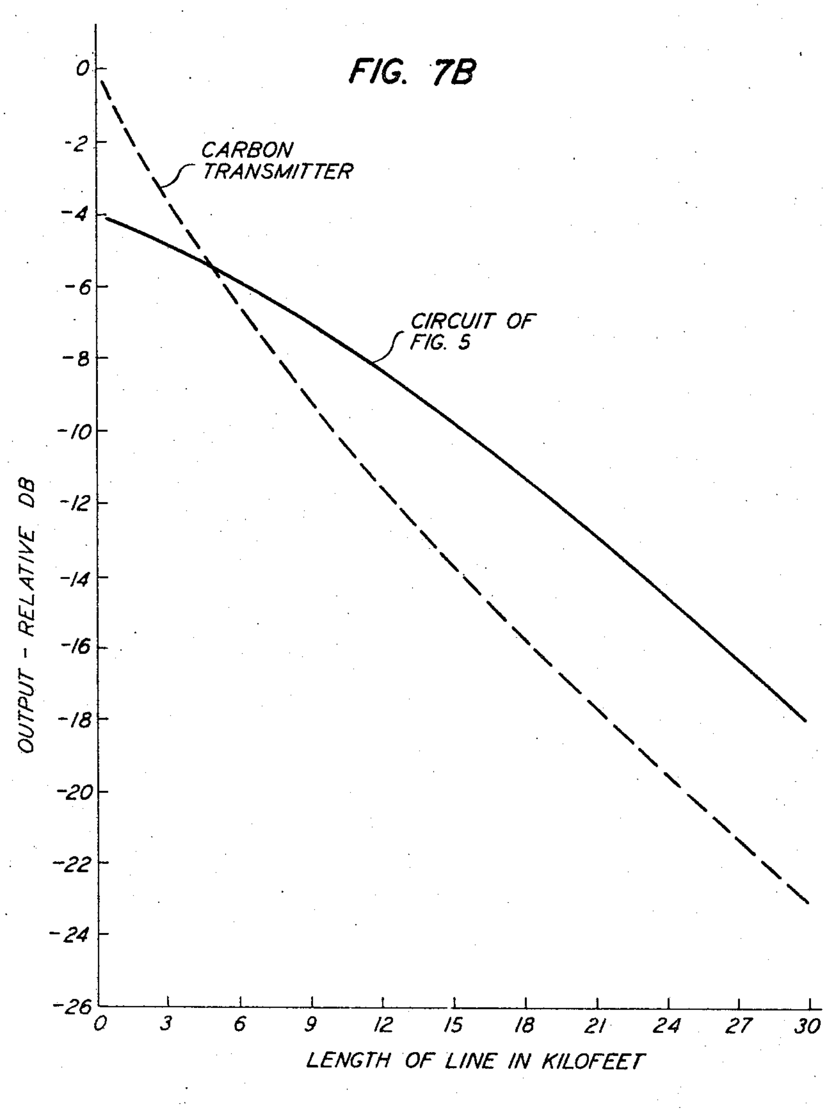
FIG. 7B is a plot of transmitter output reaching the central office in relative dB versus length of loop for the circuit of FIG. 5 and for a carbon transmitter, derived from the test arrangement of FIG. 7A.

An experimental comparison of sensitivities at 1000 Hz as functions of loop length is shown in FIG. 7B. Data for these curves was obtained from the test arrangement shown in FIG. 7A. In the test apparatus, the output from a 1000 Hz oscillator 71 is directed to a speaker 72 the output of which is in turn directed into the transmitter of a handset 73. The output from the handset 73 is applied to a terminating resistor 77 by way of the telephone set speech network 74, a 26 gauge artificial line 75 of adjustable length, and a central office line circuit 76. Battery is supplied by the line circuit in conventional fashion. Output readings were taken from a voltmeter 78 connected across the termination 77.

It is to be understood that the embodiment described herein including the specific circuit element magnitudes and current and voltage levels is merely illustrative of the principles of the invention. Various modifications may be effected by persons skilled in the art without departing from the spirit and scope of the invention.

I claim:

1. A transmitter branch for a telephone speech network comprising, in combination, an electromagnetic transmitter, means for amplifying the output of said transmitter, means for splitting the output current from said amplifying means into first and second nonreactive portions having a fixed ratio, means for utilizing one of said current portions as feedback to stabilize said amplifying means, and means for utilizing the other of said current portions to compensate for nonlinearity of said amplifying means, wherein said amplifying means comprises a two stage, direct coupled transistor amplifier, said utilizing means including means for applying feedback from the collector electrode of the second stage of said amplifier to the emitter electrode of the first stage of said amplifier, and means for applying the output of said transmitter to the base electrode of the first stage transistor of said amplifier.

2. Apparatus in accordance with claim 1 wherein said splitting means comprises first and second parallel circuit paths, said first circuit path including a diode and a resistive circuit device connected between the output of said amplifier and a power supply path, said second circuit path including a resistive circuit device and a diode connected between the output of said amplifier and a power supply path, said diodes and said resistive circuit devices being connected in opposite order in said first and second circuit paths.

3. Apparatus in accordance with claim 2 including means for biasing said amplifier, said biasing means comprising first and second resistors in series relation, said transmitter being bridged between the junction point of said first and second resistors and the input point of said amplifier, means connecting the junction point between said resistive circuit device and said diode in said second circuit path to the unconnected terminal of said second resistor, means connecting the unconnected terminal of said first resistor to the emitter electrode of the output transistor of said amplifier, and said applying means comprising means connecting the junction point between said diode and said resistive circuit device in said first circuit path to the emitter electrode of the input transistor of said amplifier.

4. Apparatus in accordance with claim 3 including a third resistive device connecting the junction between said first and second resistors to said supply path.

5. A transmitter branch for a telephone speech network comprising, in combination, first and second supply leads, an electromagnetic transmitter, a two stage, direct coupled transistor amplifier, means for furnishing stabilizing feedback for said amplifier comprising a first diode and a first resistive element connected in series between the collector electrode of the output transistor of said amplifier and said first supply lead, means for compensating for the nonlinearity of the transistors of said amplifier comprising a second resistive element and a second diode connected in series between said collector electrode and said first supply lead, biasing means comprising third and fourth resistors in series relation connected between said second supply lead and the junction between said second resistor and said second diode, an electromagnetic transmitter connected between the junction point of said third and fourth resistors and the base electrode of the input transistor of said amplifier, means connecting the emitter electrode of said output transistor to said second supply lead, and means connecting the emitter electrode of said input transistor to the junction point between said first resistor and said first diode.

6. Apparatus in accordance with claim 5 including a fifth resistor bridging the junction point between said third and fourth resistors and said first supply lead.

7. Apparatus in accordance with claim 6 including a sixth resistor shunting said transmitter.